(12) United States Patent
Palliser et al.

(10) Patent No.: US 6,712,305 B2
(45) Date of Patent: Mar. 30, 2004

(54) SEAT BELT RETRACTOR

(75) Inventors: Martyn Neil Palliser, Cumbria (GB); John Bell, Cumbria (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 10/222,880

(22) Filed: Aug. 19, 2002

(65) Prior Publication Data
US 2003/0192975 A1 Oct. 16, 2003

(30) Foreign Application Priority Data
Apr. 16, 2002 (GB) .............................. 0208699

(51) Int. Cl.[7] .............................. B60R 22/28
(52) U.S. Cl. .................... 242/379.1; 280/805; 280/806; 280/807
(58) Field of Search ........................ 242/379.1; 280/805, 280/806, 807; 297/472, 478

(56) References Cited

U.S. PATENT DOCUMENTS

| 4,323,205 A | * | 4/1982 | Tsuge et al. ............ 242/379.1 |
| 5,913,538 A | | 6/1999 | Herpich ..................... 280/805 |
| 6,216,972 B1 | | 4/2001 | Rohrle ..................... 242/379.1 |
| 2001/0008262 A1 | | 7/2001 | Huber ..................... 242/379.1 |

FOREIGN PATENT DOCUMENTS

| DE | 10040976 | 3/2002 |
| EP | 1110827 | 12/2000 |
| GB | 2345891 | 7/2000 |
| JP | 11-235967 | 8/1999 |
| JP | 2002-053007 | 2/2002 |

* cited by examiner

Primary Examiner—John Q. Nguyen
(74) Attorney, Agent, or Firm—Lonnie Drayer; Jarett Rieger

(57) ABSTRACT

A seat belt retractor has a spool mounted for rotation in the retractor for retraction or pay-out of seat belt webbing depending upon the direction of rotation of the spool. A locking ring is attached to one end of the spool. A device for locking locks the locking ring against rotation in a crash. A force limiting device allowing further pay-out of the seat belt webbing after the locking ring has locked, under the influence of a vehicle occupant's forward momentum. The force limiting device has a length of wire, attached at one end to one of the spool or the locking ring, and wound, at a distance spaced from said one end, on a pin fixed to the other end of the spool or the locking ring. Under the influence of crash forces above a predetermined value the wire is pulled around the pin.

4 Claims, 9 Drawing Sheets

SEAT BELT RETRACTOR

FIELD OF THE INVENTION

The present invention relates to a seat belt retractor.

BACKGROUND OF THE INVENTION

A seat belt retractor generally comprises a cylindrical bobbin or spool with a circular cross-section. Seat belt webbing is attached to and wound around the spool, and the spool is mounted on a spool shaft to be rotatable in the retractor to wind in webbing under the action of a retractor spring and to pay out webbing under the influence of relatively gentle forwardly directed movement of a vehicle occupant, for example to allow for normal movement associated with vehicle occupancy such as reaching forwards to activate a radio or a window, or to reach a glove compartment or door pocket. In a crash the more extreme momentum of the vehicle occupant activates a crash sensor which locks the spool against rotation and thus prevents forward motion of the vehicle occupant and injury due to the vehicle occupant colliding with the interior structure of the vehicle.

However, this sudden locking of the seat belt spool in a crash can itself sometimes cause injury to the vehicle occupant due to sudden impact of the torso with the belt webbing. This is particularly true in severe crashes. In recent years this problem has been recognized and some solutions proposed.

One known system is to effect force limiting by interposing a plastically or elastically deformable member in the force path. For example, a torsion bar may be incorporated into the spool. A torsion bar is made of steel that twists when high torque is applied and can rotate up to seven or eight times while remaining intact. It is connected to both ends of a split spool. One end of the spool is held against rotation by a locking ring engaged by a load bearing pawl when a crash sensor indicates danger. The other end of the spool is prevented from rotating by its connection to the locking ring via the torsion bar, but when the crash forces exceed a predetermined level, the torsion bar will twist and allow a limited controlled further pay-out of webbing, generally in proportion to the momentum of the vehicle occupant at the moment a crash condition is sensed. This pay-out lessens the otherwise severe restraining forces on the vehicle occupant at high speeds, especially during the initial moments of a crash.

However torsion bars are complex and expensive to form, and are not easily adaptable to different conditions, such as different vehicle characteristics, or different sizes and weights of vehicle occupants. There is a need for a less costly and less complex load limiting system.

SUMMARY OF THE INVENTION

According to the present invention there is provided A seat belt retractor comprising: a spool, mounted for rotation in the retractor for retraction or pay-out of seat belt webbing depending upon the rotation direction of the spool; a locking ring attached to one end of the spool; a means for locking the locking ring against rotation when a crash is sensed; and a means for force limiting allowing further pay-out of the seat belt webbing after the locking ring has locked, under the influence of a vehicle occupant's forward momentum, wherein the means for force limiting comprises a length of wire, attached at one end to one of the spool or the locking ring, and wound at a distance spaced from said one end, on a pin fixed to the other of the spool or the locking ring, so that under the influence of crash forces above a predetermined value, the wire is pulled around the pin.

DETAILED DESCRIPTION OF THE INVENTION

Figure 1:
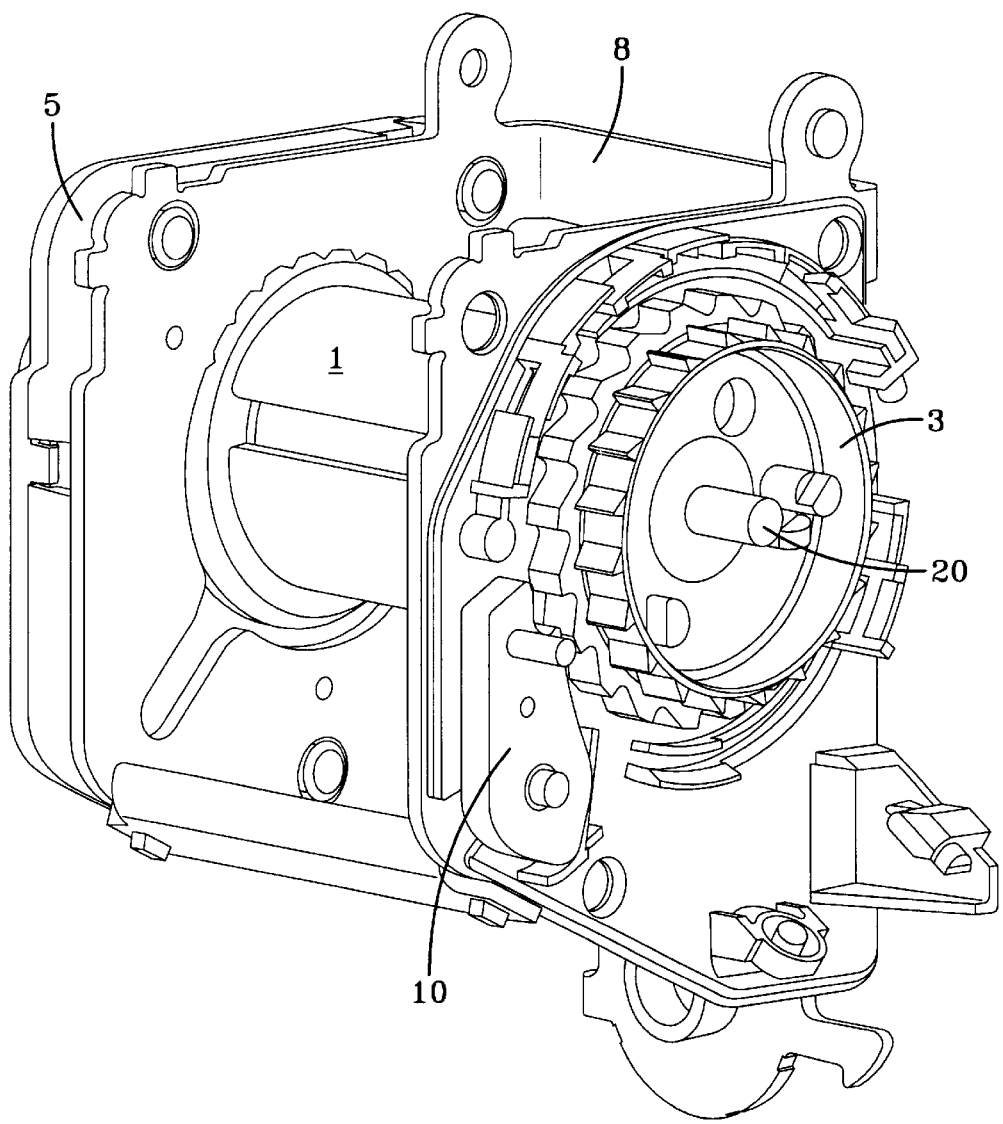
FIG. 1 is an isometric view of part of a seat belt retractor according to the prior art.
Figure 2:
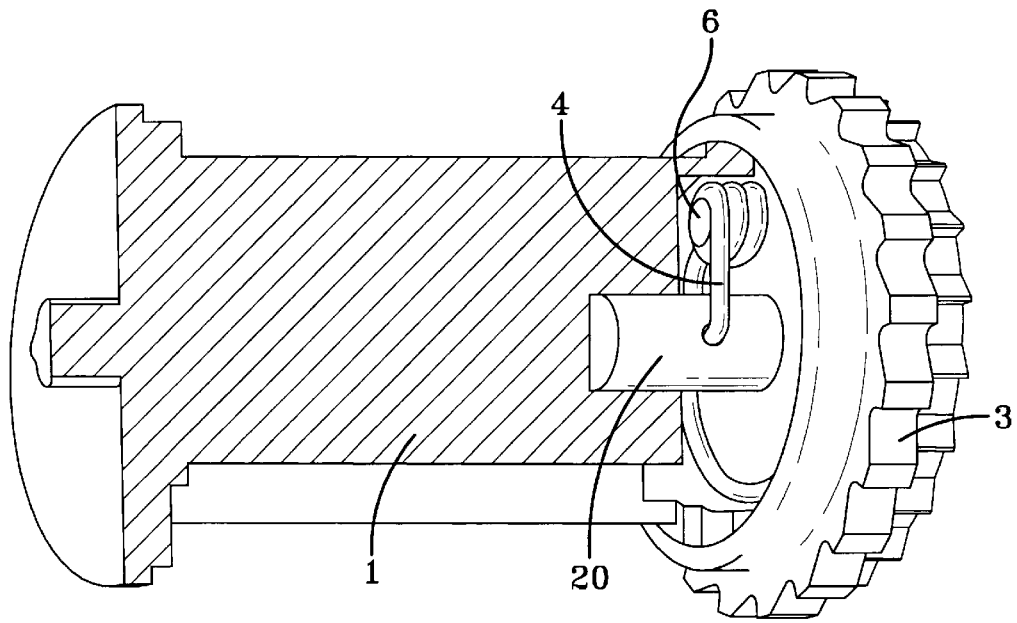
FIG. 2 is a part-cut-away isometric view of part of the seat belt retractor of FIG. 1 incorporating a first embodiment of a load limiting mechanism prior to load limiting.

The load limiting arrangement of the present invention can be used in a traditional seat belt retractor that is well known to a person skilled in the art. Such a seat belt retractor is shown in general in FIG. 1 and comprises a cylindrical retractor spool 1 mounted for rotation in a frame 8 to wind in and pay-out seat belt webbing (not shown).

In a crash, a sensor activates a locking mechanism to move a lockbar 10 to engage the teeth of a locking ring 3 fixed to one end of the spool 1, subject to further movement due to load limiting arrangements. This prevents rotation of the spool. The other end of the spool 1 is connected to a rewind spring mechanism (not shown) that comprises a clock type coiled spring that biases the spool 1 to a webbing rewound condition.

A load limiting arrangement according to the present invention comprises a wire 4 that is fitted between the locking ring 3 and the spool 1, for example between the locking ring 3 and a spool spindle 20. This may take any one of a variety of embodiments such as that shown in FIGS. 2 to 5, or that shown in FIGS. 6 to 10 or that shown in FIGS. 11 and 13 with the modifications shown in any one of FIGS. 13 to 16.

Figure 3:
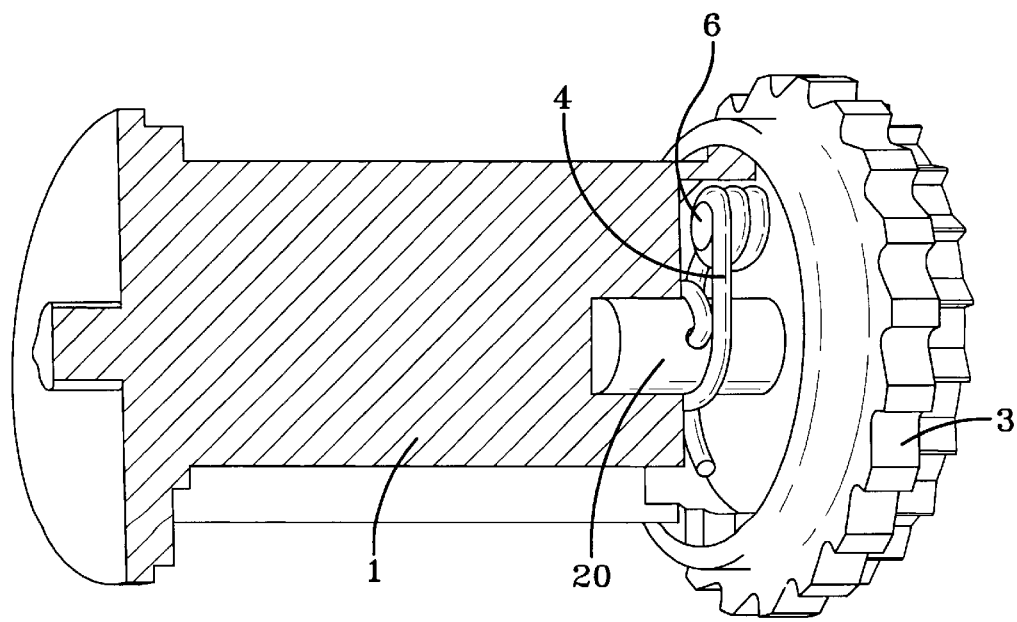
FIG. 3 is a part-cut-away isometric view of part of the seat belt retractor of FIG. 1 incorporating a first embodiment of a load limiting mechanism after load limiting.
Figure 4:
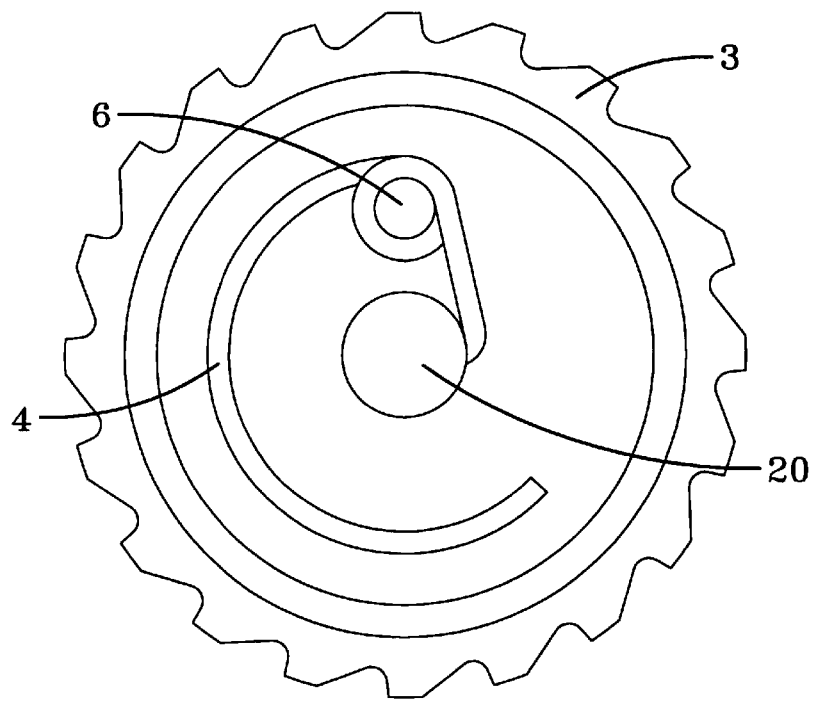
FIG. 4 is a plan view illustrating the load limiting mechanism of FIGS. 2 and 3 in more detail prior to load limiting.
Figure 5:
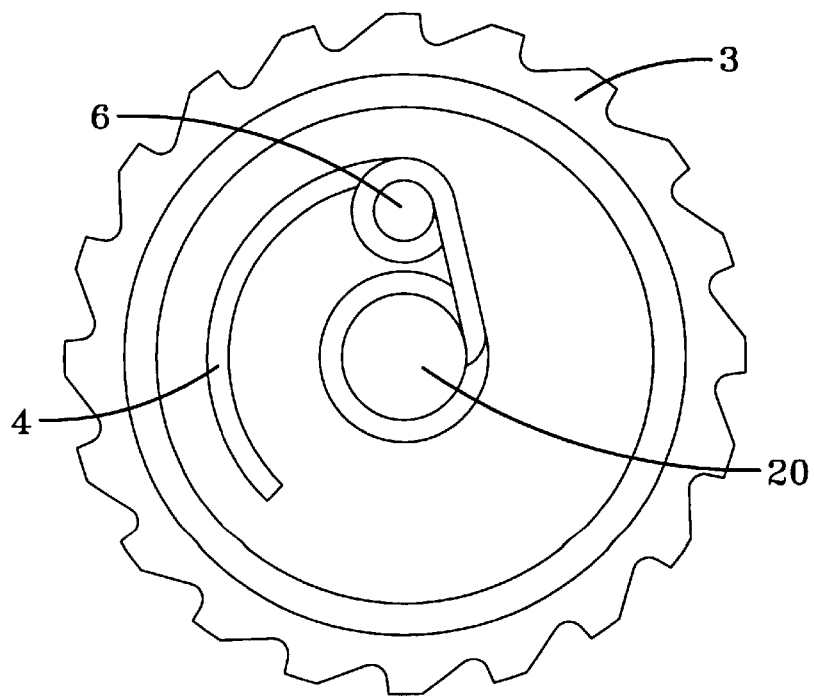
FIG. 5 is a plan view illustrating the load limiting mechanism of FIGS. 2 and 3 in more detail after load limiting.

FIGS. 2 to 5 illustrate a first embodiment of the invention in which the wire 4 is attached to the spool spindle 20 by passing through a hole 31 in the spool spindle and is coiled around a pin 6 fixed to the spool side of the locking ring 3. The spindle 20 is fixed to the spool 1 and the coils of the wire 4 are arranged to wind spirally along the pin 6. The wire is shown in plan view in FIG. 4. In FIGS. 3 and 5 the disposition of the wire during load limiting is shown as the wire 4 winds around the spindle 20.

According to other embodiments of the invention there are a plurality of pins and the wire may be wound around each with a single turn, or a multiple number of turns, or a mixture of single and multiple turns, to tailor the load limiting effect to the required turns, to tailor the load limiting effect to the required level for the intended application.

Figure 6:
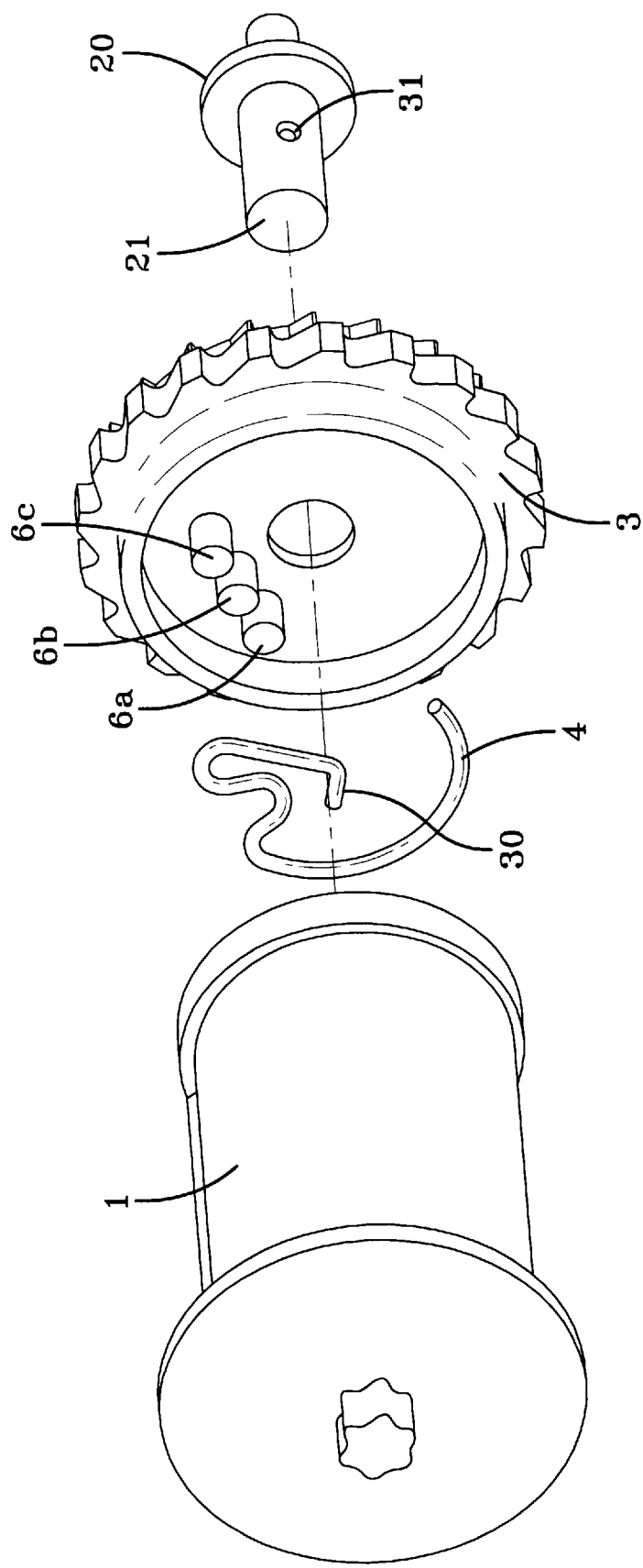
FIG. 6 is an exploded isometric view of a seat belt retractor according to a second embodiment of the invention.
Figure 7:
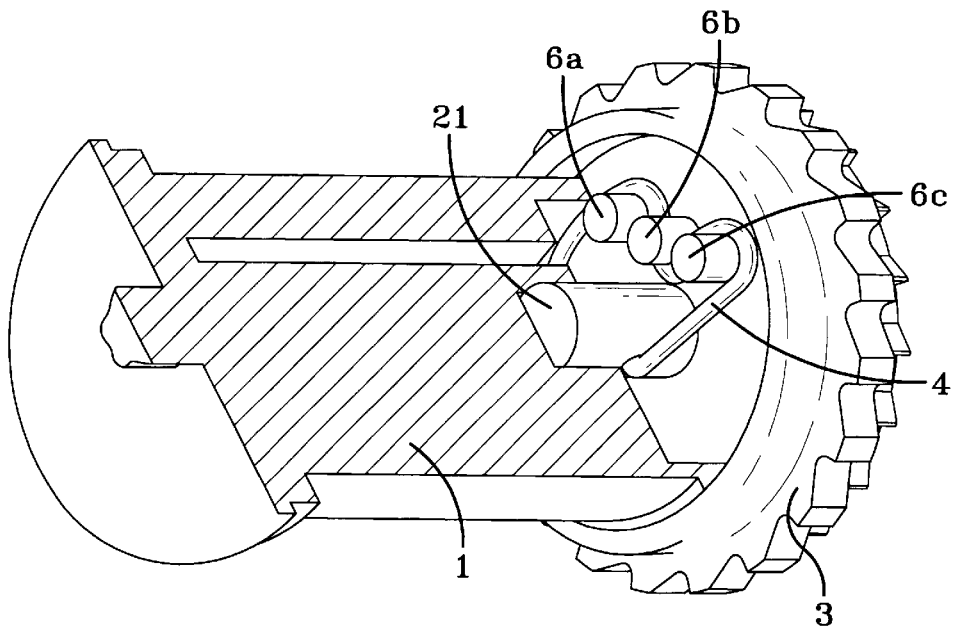
FIG. 7 is a part-cut-away isometric view of part of the seat belt retractor of FIG. 6 prior to load limiting.
Figure 8:
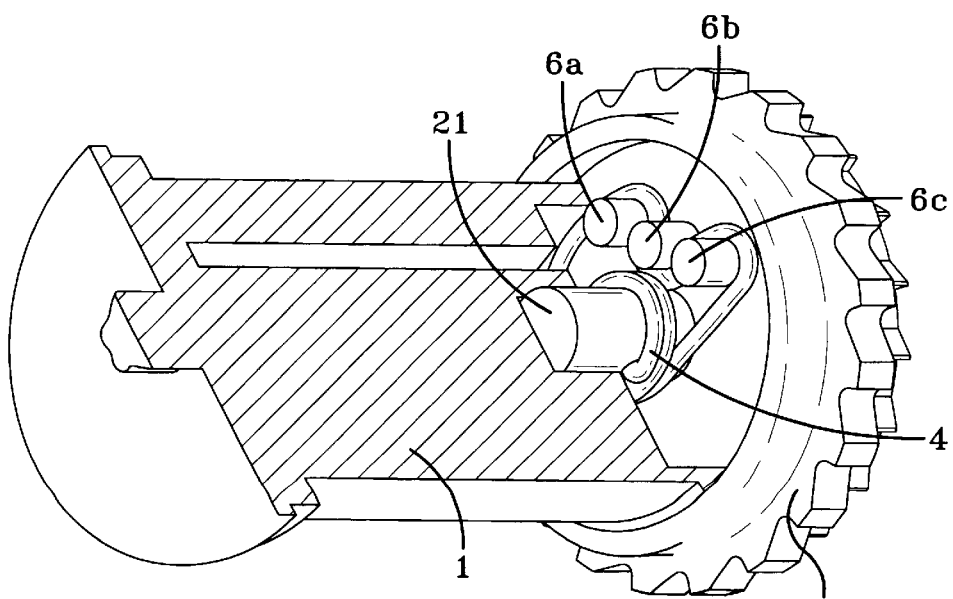
FIG. 8 is a part-cut-away isometric view of part of the seat belt retractor of FIG. 6 after load limiting.
Figure 9:
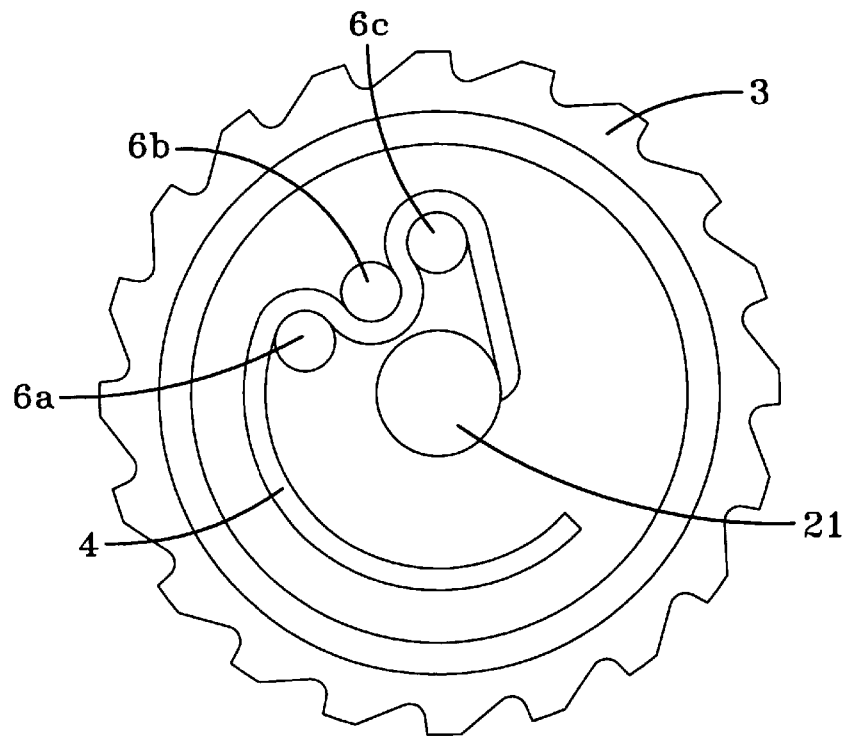
FIG. 9 is a plan view of the load limiting mechanism of FIGS. 6 to 8 in more detail prior to load limiting.
Figure 10:
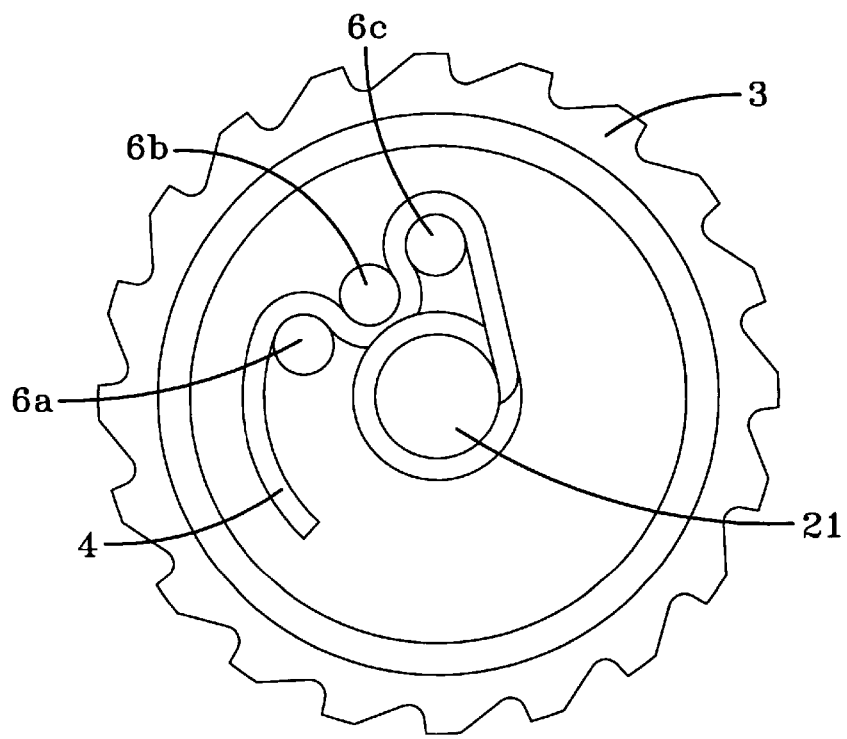
FIG. 10 is a plan view of the load limiting mechanism of FIGS. 6 to 8 in more detail prior to load limiting.

FIGS. 6 to 10 illustrate a second embodiment of the invention comprising a plurality of pins 6a, 6b, 6c, all attached to the locking ring 3. The wire 4 is attached to the spool spindle 20 by a bent end 30 of the wire that fits in a hole 31 in the spindle. The wire is then bent around each pin 6a, 6b, and 6c. This provides a single level load limiter. The wire 4 is drawn around all of the pins 6a, 6b, 6c and the load limiting load can be increased by increasing the number of pins. FIG. 6 shows embodiment this in an exploded view. FIG. 7 shows the arrangement in assembled view prior to load limiting with the wire 4 unchanged from the initial configuration shown in FIG. 6. FIG. 9 shows this in plan view. FIGS. 8 and 10 show this embodiment after load limiting, with the wire 4 coiled around the post 21 of the spool spindle 20.

Figure 11:
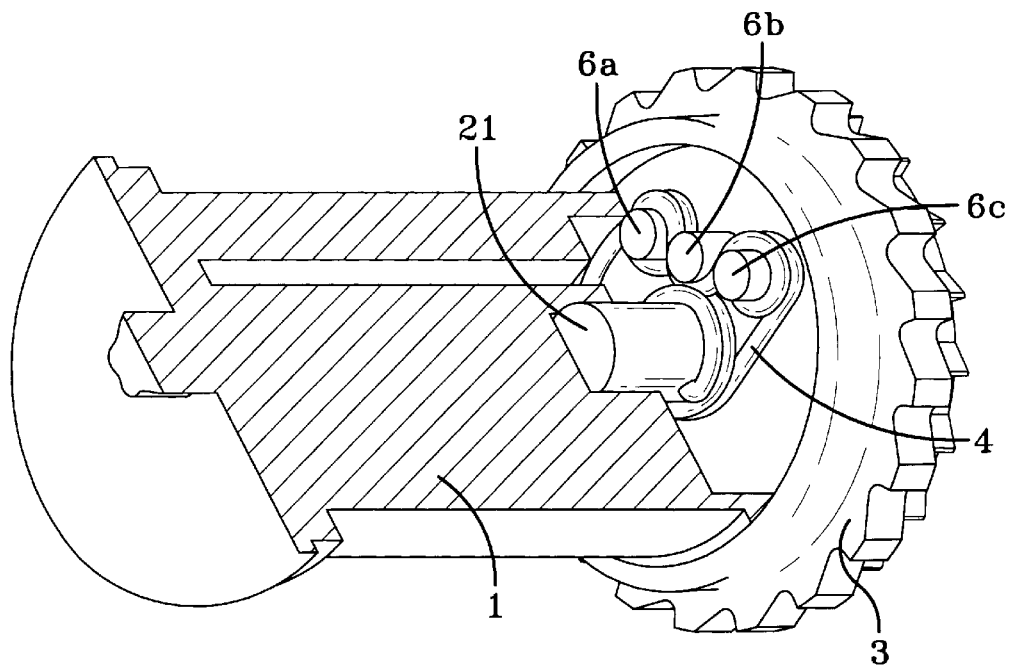
FIG. 11 is a part-cut-away isometric view of part of the seat belt retractor according to a third embodiment of the invention after load limiting.
Figure 12:
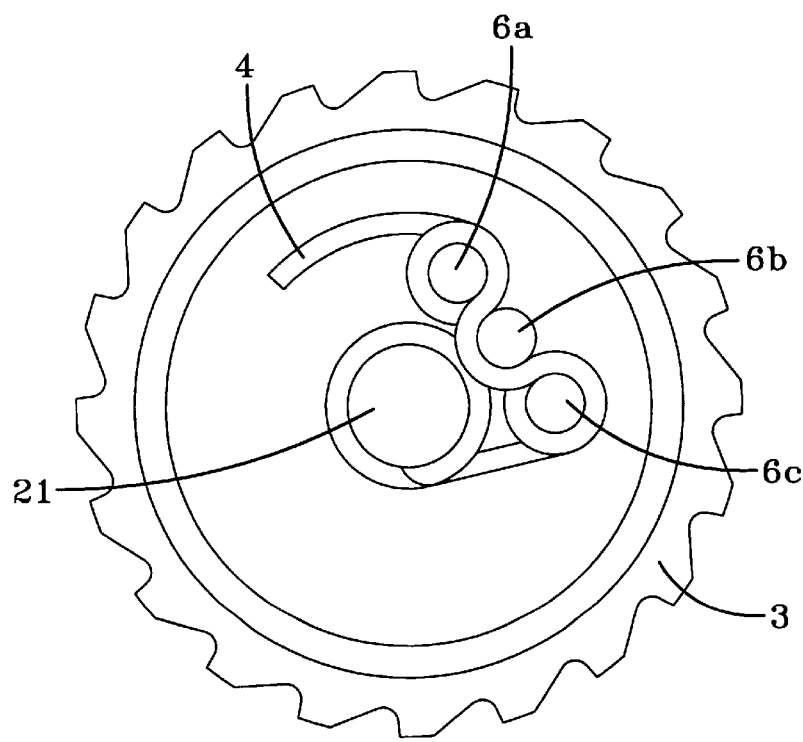
FIG. 12 is a plan view of the load limiting mechanism of FIG. 11 after load limiting.

FIGS. 11 and 12 illustrate a third embodiment of the invention comprising three pins 6a, 6b, and 6c fixed to the locking ring 3. In this embodiment the wire is anchored to the spool spindle post 21 and is wound a multiple number of turns around two of the pins 6a and 6c and partly around the third pin 6b that is disposed between the first two pins. During load limiting, as the spool turns, the wire unwinds from the multiple turns around pin 6a, 6b and 6c and is wound onto the spool spindle post 21. This arrangement provides a high level of load limiting. Of course the wire may be wrapped any number of turns around each pin 6a, 6b, and 6c in the initial configuration and many possibilities are envisaged to tailor the load limiting response to the particular conditions required. It may be arranged so that the wire 4 is wrapped around the pins 6a, 6b and 6c initially but as load limiting progresses it may be drawn completely off the first pin 6a and/or the second pin 6b. This effectively provides for two stage load limiting because the load limiting is at a high level initially when the wire 4 is bent around each pin, and a lower level when the wire is unwound from the first pin 6a. The performance of the load limiting can be tailored by changing the number of coils wrapped around each pin, the angle of the winding, the wire diameter and the number of wires.

Figure 13:
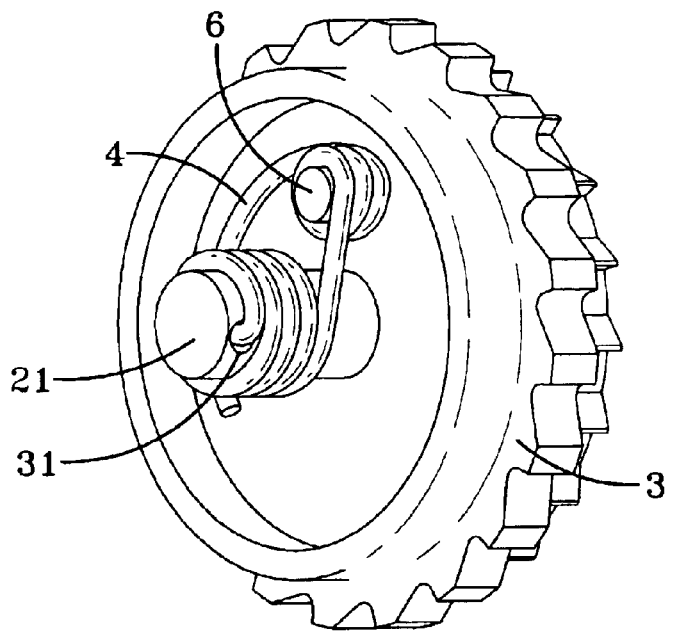
FIG. 13 illustrates a further alternative winding arrangement.
Figure 14:
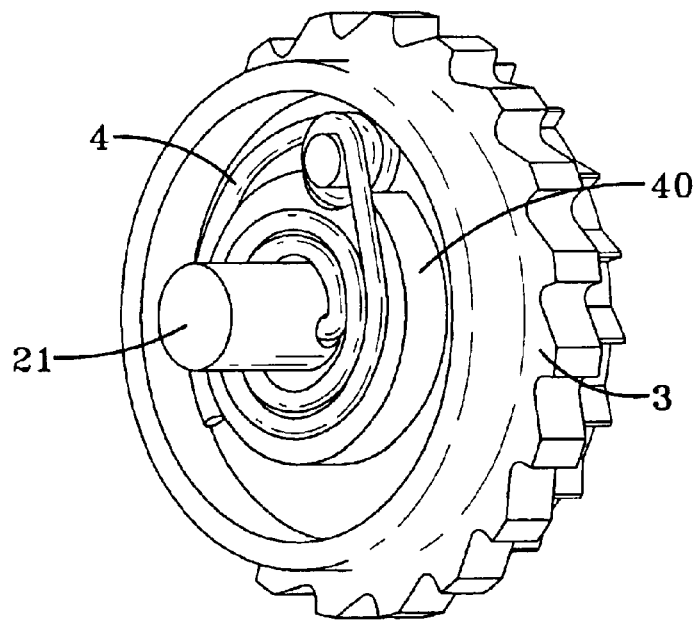
FIG. 14 illustrates another alternative winding arrangement.

FIG. 13 illustrates a fourth embodiment of the invention. The wire can be arranged to wrap radially or spirally along the axis of the pin or pins. When axial winding is used the torque required to wind the wire reduces as the angle of the coil increases, and this characteristic can be further utilized to tailor the load limiting characteristics to suit the application. A single pin 6 is shown fixed to the locking ring and the wire 4 winds itself a plurality of times around the spindle post 21 in adjacently lying turns, i.e. spirally. Alternatively the wire 4 may be coiled onto the spindle 21 in a radial fashion like a clock spring as illustrated in FIG. 14 where a guide element 40 is attached to the locking ring 3 to support the radial coils of wire 4.

Figure 15:
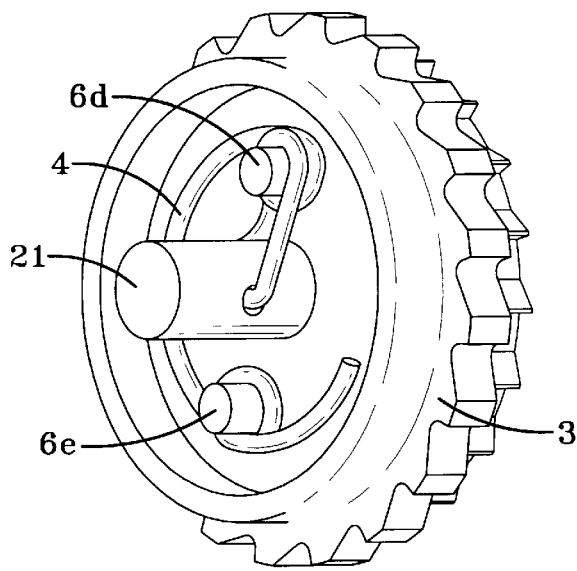
FIG. 15 illustrates yet another alternative winding arrangement before load limiting.
Figure 16:
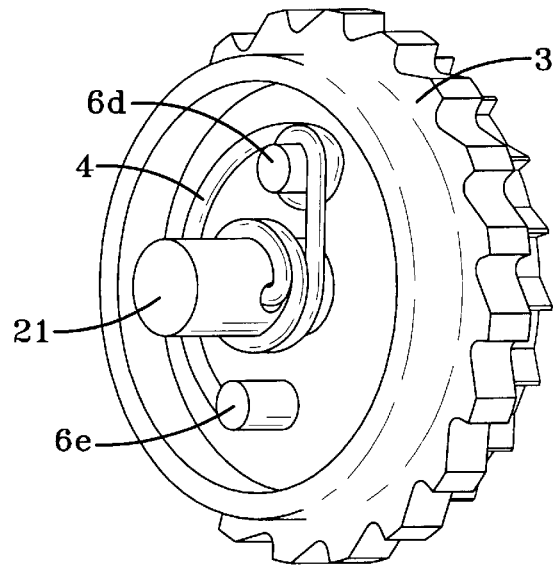
FIG. 16 illustrates yet a further alternative winding arrangement during load limiting.

In FIGS. 15 and 16 two pins 6d and 6e are set diametrically opposite each other on either side of the spindle post 21. FIG. 15 illustrates this embodiment before load limiting with the wire attached to the spindle post 21 and coiled around each pin 6d and 6e a couple of times. FIG. 16 illustrates this embodiment after load limiting with the wire 4 unwound from one pin 6e and coiled onto the post 21. Again this effectively provides two-stage load limiting as explained below with reference to the graph shown in FIG. 17.

Figure 17:
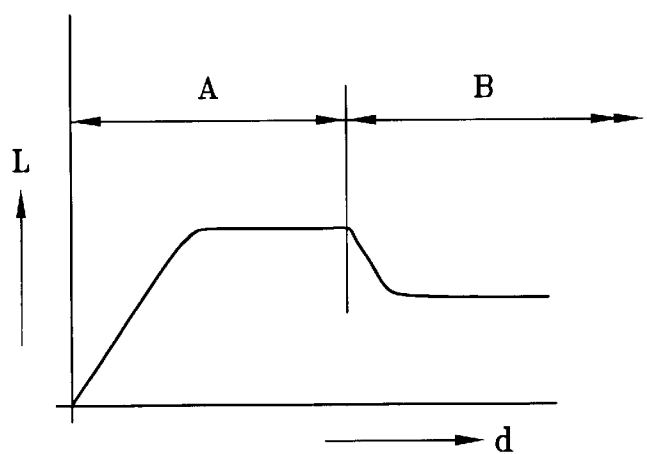
FIG. 17 is a graph of load against displacement for the embodiment of FIGS. 15 and 16.

FIG. 17 is a graph of load against displacement and the portion A relates to both pins 6d and 6e being engaged by a wire 4 whereas portion B relates to only the one pin 6d engaged by the wire 4.

Preferably the wire is wound around the pin a multiple number of turns. The wire requires energy to deform it around the pin (this is known as the capstan effect) and this creates the load limiting effect.

The end of the wire which is anchored may be attached to a spindle, preferably in the spool body and the wire will also wind around the spindle which therefore acts as a cable drum taking up the wire pulled around the pin and adding to the load limiting effect.

The wire may be pre-formed from steel with a first straight portion or a slight curve followed by one or more coils and followed by a second straight portion. The pin can then be inserted through the coils and a block or stop fixed to the first straight portion to prevent the wire from uncoiling.

An advantage of the present invention is that it is relatively inexpensive to implement and the load limiting effect can easily be changed by changing the diameter of the wire, the material of the wire, the number of turns of the wire around the pin, the pin diameter or the number of wires.

Although several preferred embodiments are illustrated and described above, there are possible combinations using other geometries, materials and different dimensions for the components that can perform the same function. Therefore, this invention is not limited to the above embodiments and should be determined by the following claims.

What is claimed is:

1. A seat belt retractor comprising:

a spool, mounted for rotation in the retractor for refraction or pay-out of seat belt webbing depending upon the rotation direction of the spool;

a locking ring attached to one end of the spool, whereby a pin being fixed to the locking ring;

a means for locking the locking ring against rotation when a crash is sensed; and a means for force limiting allowing further pay-out of the seat belt webbing after the locking ring has locked, under the influence of a vehicle occupant's forward momentum, wherein the means for force limiting comprises a length of wire, the wire is wound round the pin a multiple number of turns; and a spindle being fixed to the spool, the wire is attached to one end of the spindle whereby under the influence of crash forces above a predetermined value, the wire is pulled completely around the spindle at least two turns.

2. The seat belt retractor according to claim 1 wherein the spindle has a hole therethrough whereby the end of the wire is anchored therein.

3. The seat belt retractor according to claim 1 wherein the wire is wound around only one pin, whereby under the influence of crash forces above a predetermined value, the wire is wound around the spindle in a spiral formation in the direction of the locking ring.

4. The seat belt retractor according to claim 1 wherein the wire contacts the spindle and the pin, whereby under the influence of crash forces above a predetermined value, only the spindle and the pin influence the bending of the wire.

* * * * *